US008837399B2

(12) United States Patent
Johansson et al.

(10) Patent No.: US 8,837,399 B2
(45) Date of Patent: Sep. 16, 2014

(54) FAST NOTIFICATION OF RELATIVE RADIO-ACCESS TECHNOLOGY PRIORITIES

(75) Inventors: Thomas Johansson, Åby (SE); John Walter Diachina, Garner, NC (US); Henry Freberg, Åby (SE); Claes-Göran Persson, Mjölby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 224 days.

(21) Appl. No.: 13/304,090

(22) Filed: Nov. 23, 2011

(65) Prior Publication Data

US 2013/0053035 A1 Feb. 28, 2013

Related U.S. Application Data

(60) Provisional application No. 61/526,532, filed on Aug. 23, 2011.

(51) Int. Cl.

*H04W 4/00* (2009.01)
*H04W 48/16* (2009.01)
*H04W 48/12* (2009.01)
*H04W 48/18* (2009.01)
*H04W 88/06* (2009.01)

(52) U.S. Cl.

CPC .............. *H04W 48/16* (2013.01); *H04W 48/12* (2013.01); *H04W 48/18* (2013.01); *H04W 88/06* (2013.01)
USPC .......................................................... 370/329

(58) Field of Classification Search

USPC ................ 370/331, 328, 329; 455/436, 435.1
See application file for complete search history.

(56) References Cited

U.S. PATENT DOCUMENTS 7,437,178 B2 * 10/2008 Jeong et al. ................... 455/525
8,320,915 B2 * 11/2012 Ryu et al. .................. 455/435.3

(Continued)

FOREIGN PATENT DOCUMENTS

WO 2009020356 A1 2/2009
WO 2009021009 A1 2/2009

(Continued)

OTHER PUBLICATIONS

Nokia Siemens Networks, et al., “Referencing 3G frequencies in the (GPRS) 3G Cell Reselection list”, 3GPP TSG-GERAN Meeting #44, Nov. 16, 2009, pp. 1-6, GP-092207, agenda item 7.2.5.2.7, 3rd Generation Partnership Project, Sophia Antipolis, France.

(Continued)

*Primary Examiner* — Chandrahas Patel
(74) *Attorney, Agent, or Firm* — Coats & Bennett, PLLC

(57) ABSTRACT

System information transmitted from a wireless network is enhanced to contain additional information that indicates the relative priority between neighboring cells or frequencies in multiple Radio-Access Technologies, such as GERAN, UTRAN and E-UTRAN. In an example method implemented in a mobile station, a system information message of a first type transmitted by a base station is read. The mobile station determine whether one or more RAT priority bits are present in the system information message, wherein the presence or absence of the one or more RAT priority bits indicates whether additional ones of a plurality of available system information messages of the first type must be read before inter-RAT cell reselection may begin. If RAT priority bits are present, the mobile station selectively initiates inter-RAT cell reselection based on the one or more RAT priority bits.

24 Claims, 8 Drawing Sheets

100
UTRAN 150
132
E-UTRAN 160
114
116
GSM
130
RNC 140
TO PDN / PSTN
110

(56) References Cited

U.S. PATENT DOCUMENTS

| | | | | |
|---|---|---|---|---|
| 8,364,199 | B2 * | 1/2013 | Xue et al. | 455/552.1 |
| 2008/0200169 | A1 | 8/2008 | Gao | |
| 2010/0081438 | A1 | 4/2010 | Callender et al. | |
| 2010/0184429 | A1 | 7/2010 | Tod et al. | |

FOREIGN PATENT DOCUMENTS

| | | | |
|---|---|---|---|
| WO | 2009038368 | A1 | 3/2009 |
| WO | 2009045078 | A2 | 9/2009 |

OTHER PUBLICATIONS

Nokia Corporation, et al., "Corrections to GERAN/E-UTRAN interworking", Change Request 44.018 CR 0710, 3GPP TSG-GERAN Meeting #41, Feb. 16, 2009, pp. 1-38, GP-090496, revision 2, version 8.5.0, 3rd Generation Partnership Project, St. Julians, Malta.

Telefon AB LM Ericsson, ST-Ericsson, "Enhanced Fast Acquisition of System Information procedure," 2 Sep. 2011, 3GPP TSG GERAN#51, Tdoc GP-111231.

3RD Generation Partnership Project, "Mobile radio interface layer 3 specification; Radio Resource Control (RRC) protocol," Technical Specification Group GSM/EDGE Radio Access Network, Jun. 2011, 3GPP TS 44.018 V10.3.0 (Release 10).

ETSI, Digital cellular telecommunications system (Phase 2+); Mobile radio interface layer 3 specification; Radio Resource Control (RRC) protocol (3GPP TS 44.018 version 10.3.0 Release 10), ETSI TS 144 018 V10.3.0, pp. 1-437, Jun. 2011, Sophia Antipolis Cedex, France.

ETSI, Digital cellular telecommunications system (Phase 2+); Physical layer on the radio path; General description; (3GPP TS 45.001 version 10.0.0 Release 10), ETSI TS 145 001 V10.0.0, pp. 1-46, Apr. 2011, Sophia Antipolis Cedex, France.

ETSI, Digital cellular telecommunications system (Phase 2+); Radio subsystem link control (3GPP TS 45.008 version 10.1.0 Release 10), ETSI TS 145 008 V10.1.0, pp. 1-155, Jun. 2011, Sophia Antipolix Cedex, France.

ETSI, Digital cellular telecommunications system (Phase 2+); Multiplexing and multiple access on the radio path (3GPP TS 45.002 version 10.1.0 Release 10), ETSI TS 145 002 V10.1.0, pp. 1-114, Jun. 2011, Sophia Antipolix Cedex, France.

* cited by examiner

| 3G Meas Params Descr, GPRS_3G Meas Params Descr, 3G Add Meas Params Descr, 3G Add Meas Params Descr 2 | 3G Neighbor Cell Descr | 3G Neighbor Cell Descr continued | 3G Neighbor Cell Descr continued | 3G Priority Params Descr, Serving Cell Priority Params Descr | E-UTRAN Params Descr |
|---|---|---|---|---|---|
| **Instance no 1** SI2quater_INDEX = 0000 | **Instance no 2** SI2quater_INDEX = 0001 | **Instance no 3** SI2quater_INDEX = 0010 | **Instance no 4** SI2quater_INDEX = 0011 | **Instance no 5** SI2quater_INDEX = 0100 | **Instance no 6** SI2quater_INDEX = 0101 |

*FIG. 2*

FAST NOTIFICATION OF RELATIVE RADIO-ACCESS TECHNOLOGY PRIORITIES

RELATED APPLICATIONS

This application claims priority to U.S. Provisional Patent Application Ser. No. 61/526,532, filed 23 Aug. 2011.

FIELD OF THE INVENTION

The invention relates to cell reselection in cellular communication networks, and in particular relates to techniques for priority-based cell reselection with mobile stations capable of supporting multiple radio-access technologies (RATs).

BACKGROUND

In a GSM network, information about other available radio-access technologies (RATs) is included within system information messages sent on the Broadcast Control Channel (BCCH). These other RATS may include, for example, radio-access equipment based on Universal Terrestrial Radio-Access Network (UTRAN) technology, which includes Wideband-CDMA (W-CDMA) technology, and equipment based on Evolved Universal Terrestrial Radio-Access Network (E-UTRAN) technology, also referred to as Long-Term Evolution (LTE).

Information regarding other available RATs may be sent in a system information message called a System Information Type 2quater (SI 2quater) message, and is used by the mobiles in reselection, i.e., to find cells in other RATs (UTRAN and/or E-UTRAN) that the mobile stations can move to while in idle mode or in packet transfer mode. The SI 2quater message is described in standards documents promulgated by the 3rd-Generation Partnership Project (3GPP). In particular, version 10.3.0 of 3GPP TS 44.018 defines this message in general terms as follows:

> "This message is sent optionally on the BCCH by the network to all mobile stations within the cell giving information on additional measurement and reporting parameters and/or UTRAN neighbour cells and/or E-UTRAN neighbour frequencies and/or CSG neighbour cells. A mobile station with no UTRAN capability should ignore the 3G Neighbour Cell, 3G MEASUREMENT parameter, GPRS_3G MEASUREMENT parameter and 3G Priority parameters descriptions in this message. A mobile station with no E-UTRAN capability should ignore the E-UTRAN parameters description and GPRS E-UTRAN measurement parameters description in this message. Multiple instances of this message may be sent by the network."

The information in a SI 2quater message is encoded in the form information elements called "rest octets," which are defined in detail in Section 10.5.2.33b of 3GPP TS 44.018, v 10.3.0 (June 2011).

A single instance of the SI 2quater message includes an SI 2quater Rest Octets information element having a maximum size of 20 octets. However, information providing neighbor cell information for other RATs might easily exceed this available payload space. This means that the information elements carrying information for other RATs might not fit entirely within a single instance of an SI 2quater message, in which case several instances of this message, together forming a single coherent message set, may be required to carry all of the necessary information. In addition to neighbor cell information for other RATs, GSM-specific system information is sent on the BCCH within the set of SI 2quater messages, as is other system information.

Assuming the BCCH Norm channel format is used, a system information message (e.g., an SI 2quater message instance) may be sent once every multi-frame, which consists of 51 radio frames. 3GPP TS 45.002, chapter 6.3.1.3, v 10.1.0 (May 2011) specifies when the different system information messages may be sent. As specified therein, a value for a Transmission Condition (TC) is calculated based on the radio frame number (0 . . . 2 715 647). TC is calculated as follows:

TC=(Frame Number DIV 51)MOD 8

This means that a multi-frame number (corresponding to 51 frames) is first calculated, and the multi-frames are then grouped in 8 different groups. 3GPP standards specify that the SI 2quater message may be sent on BCCH Norm when TC is either 4 or 5, depending on what other information is distributed.

An example of how SI 2quater messages and other system information messages may be distributed on BCCH Norm is shown in Table 1 below. SI 2quater messages are labeled SI2q_1 and SI2q_2 in Table 1, while other system information messages are labeled SI1, SI2, SI3, and SI4:

TABLE 1

Example of SI 2quater Messages mapped to BCCH Norm

| TC = 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| SI1 | SI2 | SI3 | SI4 | | SI2q_1 | SI3 | SI4 | SI1 | SI2 | SI3 | SI4 | | SI2q_2 | SI3 | SI4 |

A GSM multi-frame is 3060/13 milliseconds long. Since each SI 2quater message instance can only be sent every eighth 51-frame multiframe, this means that one SI 2quater message can only be sent once every 3060/13*8 milliseconds, or approximately once every 1.88 seconds. For details of the frame structures in GSM, see chapters 5.1 and 5.2 in 3GPP TS 45.001, v. 10.0.0 (March 2011).

A single coherent set of SI 2quater messages may include, for example 3G Measurement data, 3G neighbour cell information, 3G priority information, Serving Cell Priority information and E-UTRAN information. (Here, the term "3G" refers to information related to UTRAN.) For additional details, see chapter 10.5.2.33b of 3GPP TS 44.018. The number of SI 2quater message instances required to form a single coherent message set can thus be rather large, and it is not unlikely that as many as six instances are needed. For example, six instances of SI 2quater transmitted on the BCCH may consist of the following:

- 1st instance (SI 2quater_INDEX=0000)—3G Meas. Params Descr., GPRS_3G Meas. Params Descr., 3G Add. Meas. Params Descr., 3G Add. Meas. Params Descr. 2.
- Next 3 instances (SI 2quater_INDEX=0001, 0010 and 0011)—3G Neighbour Cell Descr.
- 5th instance (SI 2quater_INDEX=0100)—3G Priority Params Descr., Serving Cell Priority Params Descr.

6th instance (SI 2quater_INDEX=0101)—E-UTRAN Params Descr.

This example is illustrated in FIG. 2.

Cell reselection from one GSM cell to another GSM cell or from a GSM cell to a WCDMA or LTE cell can be based on a method called Priority Based Cell Reselection, if priorities and thresholds are provided by the network and if the mobile station supports Priority Based Cell Reselection. Chapter 6.6.6 of 3GPP TS 45.008, v 10.1.0 (May 2011) provides further details of inter-RAT cell reselection based on priority information. With this technique, a mobile receives system information messages in the serving GSM cell that provide the mobile station with information about the priorities to be associated with the different RATs. While the GSM RAT has a single priority for the RAT itself (i.e., for all GSM cells), priority is provided on a per-frequency basis for UTRAN and E-UTRAN.

The specifications for Priority Based Cell Reselection require that system information never indicates the same priority for different RATs. However, the same priority may be used (but is not necessarily used) for frequencies within the same RAT. A range of eight different priorities (value range 0-7) are specified, in which 7 is the highest priority. Details of this scheme may be seen in chapter 9 of 3GPP TS 45.008.

According to the present specifications, in order to be able to select a new cell in another RAT the mobile must first retrieve all of the priority information available for all RATs and frequencies. In other words, a mobile station in idle mode must successfully read a complete coherent set of SI 2quater messages before it can make an inter-RAT reselection decision, unless one of the indicated RATs has been given the highest possible priority value (i.e., priority value 7) for all of its corresponding frequencies.

SUMMARY

One problem with current approaches to priority-based reselection is that it may take quite a long time to acquire the system information about the neighboring cells or frequencies and their priorities, resulting in delaying mobile reselection to a preferred RAT. For example, if the mobile happens to first read LTE-specific system information then only if the priority associated to at least one E-UTRAN frequency is set to the very highest level (i.e., priority value 7) will the mobile know that it doesn't have to read the system information providing 3G and GSM priorities before inter-RAT cell reselection to E-UTRAN can start. But if none of the priorities associated with E-UTRAN frequencies are set to the highest level (i.e., all E-UTRAN frequencies have priority values from 0 to 6) then the mobile must also read the information about 3G and GSM before inter-RAT cell reselection can be started, since in this case it is possible, for example, that UTRAN frequencies have the highest priority of all RATs.

A solution that mitigates the potential for a mobile station experiencing such delays is therefore beneficial, since operators place a high level of importance on ensuring that mobile stations gravitate to the preferred RAT with a minimum of delay. In several embodiments, the techniques described below mitigate the delay experienced by a mobile station when performing inter-RAT reselection whenever priority based cell reselection is used.

In the new approaches proposed herein, system information transmitted from the network is enhanced to contain additional information that indicates the relative priority between GERAN, UTRAN and E-UTRAN, using a mechanism that is faster than the legacy method of forcing a mobile station to first read all priority information available for all RATs and frequencies before being able to determine the relative priority between GERAN (as a RAT), UTRAN (where band specific priorities apply) and E-UTRAN (where band specific priorities apply).

More particularly, in several embodiments of the presently disclosed techniques, a method implemented in a mobile station comprises: reading a first system information message of a first type transmitted by a base station; determining whether one or more RAT priority bits are present in the system information message, wherein the presence or absence of the one or more RAT priority bits indicates whether additional ones of a plurality of available system information messages of the first type must be read before inter-RAT cell reselection may begin; and selectively initiating inter-RAT cell reselection based on the one or more RAT priority bits within a system information message of the first type. In some embodiments, the one or more bits comprise a single bit that, when present, indicates either that neighbor cells in a UTRAN network have the highest priority compared to all cells belonging to other RATs described in system information messages of the first type or that neighbor cells in an E-UTRAN network have the highest priority compared to all cells belonging to other RATs described in system information messages of the first type. In several of these embodiments, the absence of the single bit indicates that additional ones of a plurality of available system information messages of the first type must be read before inter-RAT cell reselection may begin.

In some embodiments, the one or more bits comprise a pair of bits, the absence of which indicates that additional ones of a plurality of available system information messages of the first type must be read before inter-RAT cell reselection may begin, the pair of bits indicating, when present, either: (i) that UTRAN neighbor cells have the highest priorities and that reselection to UTRAN may be initiated immediately upon reading the current instance of the system information message of the first type, (ii) that UTRAN neighbor cells have the highest priorities and that reselection to UTRAN may be initiated upon reading all instances of the system message of the first type that include UTRAN information; (iii) that E-UTRAN neighbor cells have the highest priorities and that reselection to E-UTRAN may be initiated immediately upon reading the first (current) instance of the system information message of the first type, or (iv) that E-UTRAN neighbor cells have the highest priorities and that reselection to E-UTRAN may be initiated upon reading all instances of the system message of the first type that include E-UTRAN information.

In other embodiments, the one or more bits comprise a pair of bits associated with information for a given RAT, the absence of which bits indicates that additional ones of a plurality of available system information messages of the first type must be read before inter-RAT cell reselection may begin, the pair of bits indicating, when present, either: (i) that there are frequencies in RATs other than the given RAT (i.e., the RAT for which information is being extracted from the current instance of the system information message of the first type being read) that have higher priority, (ii) that there are no frequencies in RATs other than the given RAT having higher priority than the given RAT but that there are other frequencies associated with the given RAT, identified in other instances of the system information message of the first type, which have the same priority or higher priority than the given frequency (i.e. the frequency or frequencies associated with the given RAT), or indicating that unallowed cells are defined on the given frequency in another instance of the system information message; or (iii) that the given frequency may be used for cell reselection without reading any further instances of the system information message of the first type.

Other embodiments of these techniques include methods implemented in one or network nodes, where the methods comprise assembling and transmitting system information messages of the first type having the one or more RAT priority bits described in the several methods above, based on the relative priorities corresponding to neighbor cells of several RATs described in the system information messages. For example, one example method comprises: evaluating the relative priorities for two or more cells and/or frequencies corresponding to at least two radio-access technologies; generating one or more RAT priority bits based on said evaluation; and transmitting a series of two or more system information messages wherein at least one of the two or more system information messages includes the one or more RAT priority bits. In some embodiments, the one or more bits comprise a single bit and generating one or more RAT priority bits comprises setting the single bit to one value to indicate that neighbor cells in a UTRAN network have the highest priority compared to all cells belonging to other RATs described in system information messages of the first type or setting the single bit to a second value to indicate that neighbor cells in an E-UTRAN network have the highest priority compared to all cells belonging to other RATs described in system information messages of the first type.

In some embodiments, the one or more bits comprise a pair of bits, and generating one or more RAT priority bits comprises setting the pair of bits (i) to a first value to indicate that UTRAN neighbor cells have the highest priorities and that reselection to UTRAN may be initiated immediately upon reading the first instance of the system information message, (ii) to a second value to indicate that UTRAN neighbor cells have the highest priorities and that reselection to UTRAN may be initiated upon reading all instances of the system message that include UTRAN information; (iii) to a third value to indicate that E-UTRAN neighbor cells have the highest priorities and that reselection to E-UTRAN may be initiated immediately upon reading the first system information message, or (iv) to a fourth value to indicate that E-UTRAN neighbor cells have the highest priorities and that reselection to E-UTRAN may be initiated upon reading all instances of the system message that include E-UTRAN information.

In some embodiments, the one or more bits comprise a pair of bits, and generating one or more RAT priority bits comprises setting the pair of bits (i) to a first value to indicate that there are frequencies in RATs other than the given RAT that have higher priority, (ii) to a second value to indicate that there are no frequencies in RATs other than the given RAT having higher priority than the given RAT but that there are other frequencies within the given RAT, identified in other instances of the system information message, which have the same priority or higher priority than the given frequency, or indicating that unallowed cells are defined on this frequency in another instance of the system information message; or (iii) to a third value to indicate that the indicated frequency may be used for cell reselection without reading any further instances of the system information message.

Further embodiments include mobile station apparatus and network node apparatus corresponding to the above-summarized methods. An example mobile station apparatus comprises a radio transceiver configured for multi-RAT operation (e.g., for GERAN operation along with UTRAN operation, E-UTRAN operation, or both) and a controller, the controller comprising a processing circuit configured to carry out one or several of the methods summarized. The processing circuit in this mobile station apparatus may comprise, for example, a microprocessor, microcontroller, and/or digital signal processor, along with a memory device storing program instructions for execution by the microprocessor, microcontroller, and/or digital signal processor, the stored program instructions comprising instructions for carrying out the methods summarized above and described in more detail herein.

In particular, one example mobile station apparatus for use in a wireless network and operable according to multiple RATs comprises means for receiving a first system information message of a first type transmitted by a base station, means for determining whether one or more RAT priority bits are present in the first system information message, means for determining, based on the presence or absence of the one or more RAT priority bits, whether additional ones of a plurality of available system information messages of the first type must be read before inter-RAT cell reselection may begin, and means for selectively initiating inter-RAT cell reselection based on the one or more RAT priority bits, when present in the first system information message. An example network node for use in a wireless network comprises a means for evaluating relative priorities for two or more cells or two or more frequencies, wherein the two or more cells or two or more frequencies correspond to at least two radio-access technologies, a means for generating one or more RAT priority bits based on said evaluation, and a means for transmitting a series of two or more system information messages, wherein at least one of the two or more system information messages includes the one or more RAT priority bits.

Discussions above and below relating to any one of the aspects of the invention are also, in applicable parts, relevant to any of the other aspects of the present invention. Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Of course, those skilled in the art will appreciate that the present invention is not limited to the above features, advantages, contexts or examples, and will recognize additional features and advantages upon reading the following detailed description and upon viewing the accompanying drawings.

BRIEF DESCRIPTION OF THE DRAWINGS

FIG. 2 illustrates an example of a SI 2quater message set segmented into six instances.

DETAILED DESCRIPTION

Figure 1:
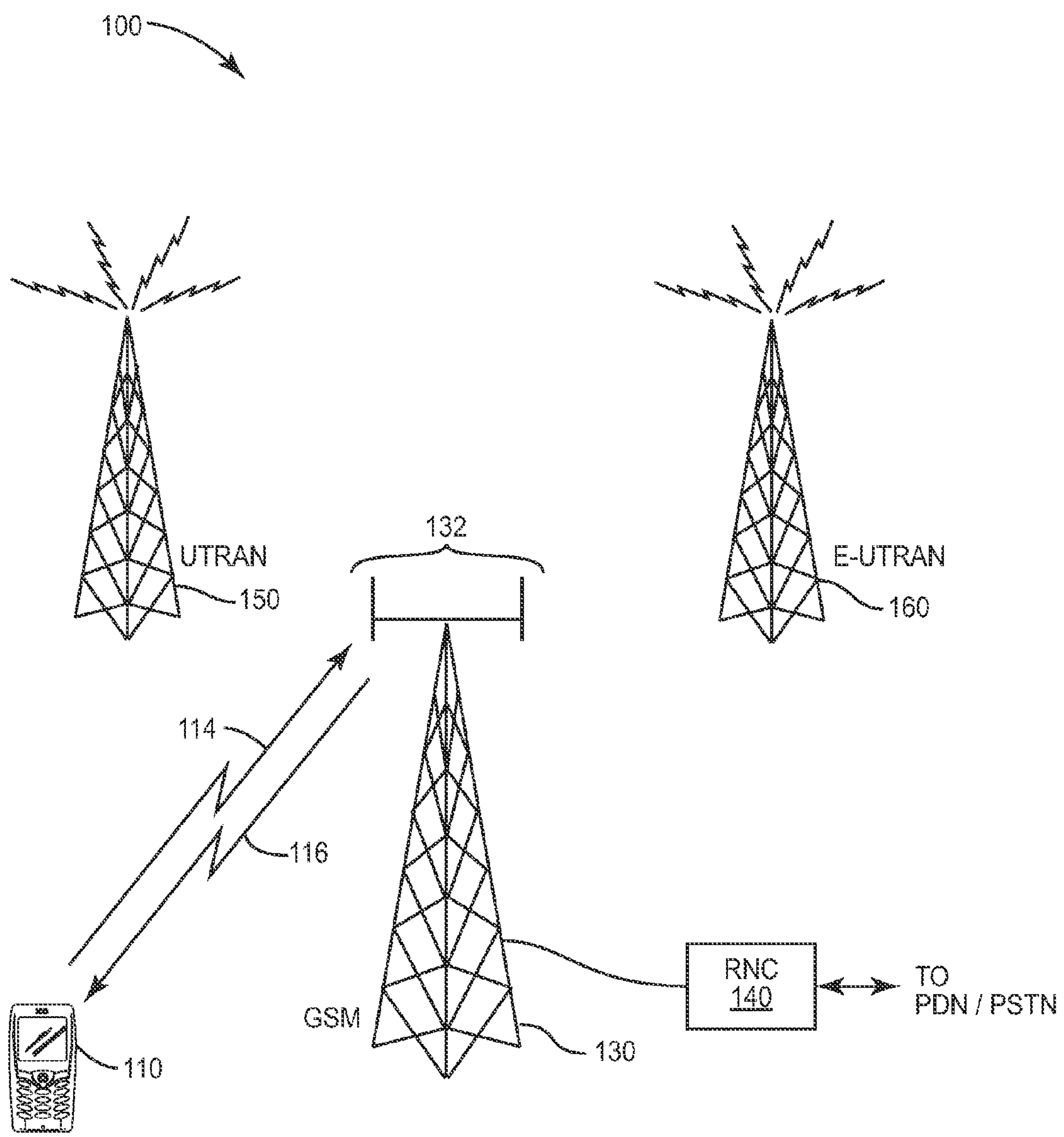
FIG. 1 illustrates a wireless communication system in accordance with some embodiments of the present invention.

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

The following discussion focuses primarily on control signaling in a GSM system and, in particular in GSM EDGE networks (i.e., GSM EDGE Radio Access Networks, or GERAN) and refers to messages transmitted in those networks. However, the techniques described herein can be applied to various wireless communication systems, including those that use code division multiple access (CDMA), time division multiple access (TDMA), frequency division multiple access (FDMA), orthogonal frequency division multiple access (OFDMA), single carrier-frequency division multiple access (SC-FDMA), or other radio access and modulation schemes. CDMA-based systems include those that are based on specifications for Universal Terrestrial Radio Access (UTRA), CDMA2000, etc. UTRA in turn includes Wideband-CDMA (W-CDMA) and other variants of CDMA, whileCDMA2000 includes IS-2000, IS-95 and IS-856 standards. Well-known TDMA systems include the Global System for Mobile Communications (GSM), while systems based on OFDMA include Evolved UTRA (E-UTRA), Ultra Mobile Broadband (UMB), IEEE 802.11 (Wi-Fi), IEEE 802.16 (WiMAX), IEEE 802.20, Flash-OFDM, etc.

FIG. 1 illustrates components of a wireless network 100, including mobile station 110 and base station 130. Base station 130 communicates with mobile station 110 via one or more antennas 132; individual ones or groups of these antennas are used to serve pre-defined sectors and/or to support any of various multi-antenna transmission schemes, such as multiple-input multiple-output (MIMO) transmission schemes. Base station 130 provides mobile station 110 with a link to the public switched telephone network (PSTN) and/or a public data network (PDN), such as the Internet, through RNC 140.

In the system illustrated in FIG. 1, mobile station 110 is communicating with base station 130 over an uplink (mobile station-to-base station) 114 and a downlink (base station-to-mobile station) 116. FIG. 1 also illustrates a neighboring UTRAN base station 150 and neighboring E-UTRAN base station 160, with which mobile station 110 may be capable of communicating; it should be understood that these base stations "neighbor" base station 130 in a physical sense (i.e., having coverage areas that are nearby or overlap base station 130's coverage area) or in a frequency sense (i.e., operating in the same general area but on a different carrier frequency) or both.

Several of the embodiments are described herein in connection with a wireless transceiver in a radio access terminal, such as the mobile station 110 illustrated in FIG. 1. While the term "mobile station" is the term commonly used by 3GPP and others for the access device or end user equipment in documentation describing 2G wireless communication systems, it should be understood as used herein to mean the end user equipment or access terminal for any applicable communication system, and can be used interchangeably with terms such as "mobile," "mobile device," "user equipment" or "UE," and the like. More generally, a radio access terminal, which communicates wirelessly with fixed base stations in the wireless network, can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Similarly, various embodiments are described herein in connection with a controlling network node such as a wireless base station or a radio network controller, examples of which are illustrated in FIG. 1 as GSM base station 130 and RNC 140. Wireless base station 130 communicates with access terminals and is referred to in various contexts (including contexts other than GSM) as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit. Similarly, the terms "RNC" or "network node" need not refer to a single physical unit but may also refer to a collection of functional elements implemented in two or more physical units.

As noted earlier, in GSM networks a mobile station must first read all of the priority information available for all RATs and frequencies (unless one of the indicated RATs has been given the highest possible priority value (i.e., priority value 7)) before being allowed to make an inter-RAT reselection decision. One problem with this requirement is that it may take quite a long time to acquire this information, resulting in delaying mobile reselection to a preferred RAT. For example, if the mobile happens to first read the LTE specific system information then only if the priority associated to at least one E-UTRAN frequency is set to the very highest level (i.e., priority value 7) will the mobile know that it doesn't have to read the system information providing 3G and GSM priorities before inter-RAT cell reselection to E-UTRAN can start. But if none of the priorities associated with E-UTRAN frequencies is set to the highest level (i.e., all E-UTRAN frequencies have priority values from 0 to 6) then the mobile has to also read the system information about 3G and GSM priorities before inter-RAT cell reselection can be started, since in this case it is possible, for example, that UTRAN frequencies have the highest priority of all RATs.

In the example given above, where six instances of the SI 2quater messages are broadcasted, it may take up to 6*1.88 seconds, or approximately 11 seconds, to read all the system information and to retrieve all the priorities associated with each RAT. The possibility of performing inter-RAT reselection is delayed accordingly, assuming each SI 2quater message instance in the set is correctly received the first time a mobile station attempts to read it. On the other hand, if any SI 2quater message instance is incorrectly received, then it may take up to 12*1.88 seconds, or approximately 22 seconds, to acquire the needed system information. In this case, the delay experienced before an inter-RAT reselection can take place becomes even more dramatic. A solution that mitigates the potential for a mobile station experiencing such delays is therefore deemed beneficial since operators place a high level of importance on ensuring that mobile stations gravitate to the preferred RAT with a minimum of delay under all circumstances.

One such solution is to augment the previously existing SI 2quater messages to include one or several bits per message instance or per neighbor cell frequency, where these bits allow a mobile station to more quickly determine the relative priorities among the available RATs, and therefore to start inter-RAT reselection more quickly than allowed for in conventional systems. Three examples of this general approach follow.

Mechanism 1:

An optional one-bit “RAT Priority” field is added as an extension to the legacy SI 2quater message, allowing for any instance of SI 2quater in the coherent set of SI 2quater messages to provide relative priority information, even if that instance of SI 2quater provides no GERAN, UTRAN or E-UTRAN related information. In some embodiments, this one-bit field is interpreted as follows, although other coding of the same or similar information is possible:

- The absence of the RAT Priority field means that a full set of SI 2quater messages must be read to determine relative priorities of different RATs. The RAT Priority field can, for example, be excluded when GERAN is the highest priority RAT, in which case it is not time critical for the mobile station to read the UTRAN and/or E-UTRAN information sets.
- The RAT Priority field is included in a received SI 2quater message and set to zero, indicating that UTRAN is the highest priority RAT (i.e., all UTRAN frequency bands have higher priorities compared to other RATs, even while different UTRAN frequencies may have different relative priorities). The mobile station must read a full UTRAN information set, which may include two or more instances of SI 2quater messages, before attempting reselection to UTRAN. However, it is not necessary to read all of the SI 2quater instances. Once a full UTRAN information set is received, the mobile station may immediately initiate reselection to UTRAN.
- The RAT Priority field is included in a received SI 2quater message and set to 1, indicating that E-UTRAN is the highest priority RAT (i.e., all E-UTRAN frequency bands have higher priorities compared to other RATs, even while different E-UTRAN frequencies may have different relative priorities). The mobile station must read a full E-UTRAN information set, which may include two or more instances of SI 2quater messages, before attempting reselection to E-UTRAN. However, it is not necessary to read all of the SI 2quater instances. Once a full E-UTRAN information set is received, the mobile station may immediately initiate reselection to E-UTRAN.

In one example according to this first mechanism, once a mobile station understands that UTRAN (all frequency bands) has a higher priority than both GERAN and E-UTRAN (all frequency bands), i.e., the RAT Priority field is set to 0 as discussed above, then the mobile station can start inter-RAT reselection from GERAN to UTRAN prior to reading any system information that only provides GERAN or E-UTRAN related priority information.

In another example, once a mobile station understands that E-UTRAN (all frequency bands) has a higher priority than both GERAN and UTRAN (all frequency bands), i.e., the RAT Priority field is set to 1 as discussed above, then it can start inter-RAT reselection from GERAN to E-UTRAN prior to reading any system information providing GERAN or UTRAN related priority information. If it is unable to find any E-UTRAN coverage in its current location, then it reads BCCH system information providing GERAN and UTRAN related priority information to determine the relative priorities of GERAN and UTRAN.

Mechanism 2:

An alternative approach is to indicate, on a per-SI 2quater message instance basis or on a per-UTRAN or E-UTRAN information set basis (i.e., once per set of coherent message instances containing all of either UTRAN or E-UTRAN related information), whether the mobile station may start cell reselection to the indicated RAT (i.e., the RAT for which information is being extracted from the current instance of the system information message being read) based on the received information in the current message instance or on the information received in the complete UTRAN or E-UTRAN information set. In several embodiments based on this approach, an optional two-bit “RAT Priority” field is added as an extension to the legacy SI 2quater messages. This two-bit field allows any instance of SI 2quater in the coherent set of SI 2quater messages to indicate whether the mobile station may start cell reselection to an indicated RAT based on the information received in the single (current) message instance or on the information received in the complete UTRAN or E-UTRAN information set, even if the mobile station has not received any priority information for the other RATs.

In some embodiments, this two-bit field is interpreted as follows, although other coding of the same or similar information is possible:

- The absence of the RAT Priority field indicates that a full set of SI 2quater messages must be read to determine relative priorities of different RATs. The RAT Priority field can, for example, be excluded when GERAN is the highest priority RAT, in which case it is not time critical for the mobile station to read the UTRAN/E-UTRAN information sets.
- The RAT Priority field is included in a received SI 2quater message and set to 00, indicating that UTRAN has the highest priority (i.e., that all UTRAN frequency bands have higher priorities compared to other RATs, even while different UTRAN frequencies may have different relative priorities). This setting further indicates that reselection to UTRAN is allowed immediately upon reading this instance (i.e., the current instance) of the SI 2quater message.
- The RAT Priority field is included in a received SI 2quater message and set to 01, indicating again that UTRAN has the highest priority (i.e., that all UTRAN frequency bands have higher priorities compared to other RATs, even while different UTRAN frequencies may have different relative priorities). This setting indicates that reselection to UTRAN may be initiated upon reading all instances of the SI 2quater message necessary to obtain a full UTRAN information set.

The RAT Priority field is included in a received SI 2quater message and set to 10, indicating that E-UTRAN has the highest priority (i.e., that all E-UTRAN frequency bands have higher priorities compared to other RATs, even while different E-UTRAN frequencies may have different relative priorities). This setting further indicates that reselection to E-UTRAN is allowed immediately upon reading this instance (i.e., the current instance) of the SI 2quater message.

The RAT Priority field is included in a received SI 2quater message and set to 11, indicating that E-UTRAN has the highest priority (i.e., that all E-UTRAN frequency bands have higher priorities compared to other RATs, even while different E-UTRAN frequencies may have different relative priorities). This setting indicates that reselection to E-UTRAN may be initiated upon reading all instances of the SI 2quater message necessary to obtain a full E-UTRAN information set.

In one example based on this approach, upon reading an SI 2quater message instance in which the RAT Priority field is set to 00 (as described above), the mobile station can start inter-RAT reselection from GERAN to UTRAN prior to reading any more instances of the SI 2quater message, i.e., prior to reading the full set of UTRAN information or prior to reading any message instance containing E-UTRAN information.

In another example, if E-UTRAN has the highest priority and two instances of the SI 2quater message are needed to include the full E-UTRAN information set, instance one may contain E-UTRAN frequencies with different priorities while instance two may contain information about unallowed physical cell identifiers (PCIDs). In such a scenario the RAT Priority field should indicate that cell reselection towards E-UTRAN can only be started upon the mobile station reading all instances of the SI 2quater message that contain a full E-UTRAN information set. Thus, the RAT Priority field in this case should be set to 11, as discussed above. This is because one or more E-UTRAN frequency bands may contain not allowed PCIDs.

Mechanism 3:

Another approach is to include a "RAT Frequency Priority" field on a per-UTRAN frequency and/or per-E-UTRAN frequency basis, to indicate whether the mobile station may start cell reselection to the indicated RAT frequency based on the received information in the current message instance or based on the information received in the complete UTRAN or E-UTRAN information set. In some embodiments, a two-bit field is used and interpreted as follows, although other coding of the same or similar information is possible:

The absence of the RAT Frequency Priority field indicates that a full set of SI 2quater messages must be read to determine relative priorities of different RATs. The RAT Priority field can, for example, be excluded when GERAN is the highest priority RAT in which case it is not time critical for the mobile station to read the UTRAN/E-UTRAN information sets.

The RAT Frequency Priority field is included for a given frequency and set to 00, indicating that there are frequencies in other RATs that have higher priority. This means that a full set of the SI 2quater message or a subset of the SI 2quater messages (i.e., the information set for the RAT with the highest priority) must be read to determine relative priorities of different RATs.

The RAT Frequency Priority field is included for a given frequency and set to 01, indicating that there are no frequencies in other RATs having higher priority than the indicated RAT (i.e., the RAT for which information is being extracted from the current instance of the system information message being read) but there are other frequencies within the indicated RAT, in other instances of the SI 2quater message, having the same priority or higher priority than the indicated frequency (i.e., the frequency or frequencies associated with the indicated RAT), or indicating that unallowed cells are defined on this frequency in another instance of the SI 2quater message. This means that all instances of the SI 2quater message containing the full information set for this RAT must be read.

The RAT Frequency Priority field is included for a given frequency and set to 10, indicating that the indicated frequency may be used for cell reselection without reading any further instances of the SI 2quater message.

It should be noted in connection with any of the techniques described above that if the mobile station has started the cell reselection process for a given target cell after acquiring a subset of the SI2quater messages, the mobile station may continue to read additional instances of the SI2quater message as long as the mobile station remains in the serving cell. Any of the cells/frequencies included in these additional instances of the SI2quater message may be chosen for reselection, based on their relative priorities, in the event that the first reselection process fails towards the target cell.

Figure 3:
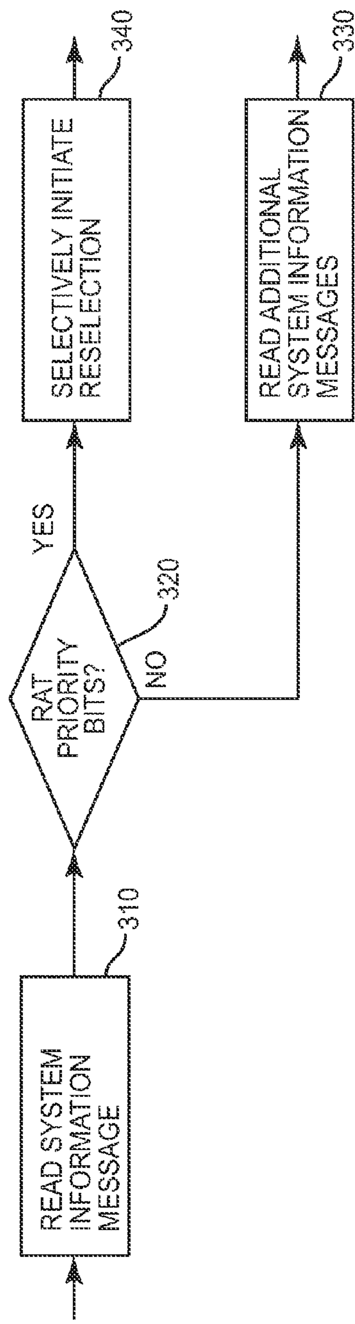
FIG. 3 is a process flow diagram illustrating an example technique for optimized cell reselection processing in a mobile station.

FIG. 3 is a process flow diagram illustrating, at a general level, one example technique for improved inter-RAT cell reselection such as might be implemented in a mobile station. As shown at block 310, the mobile station first reads a system information message of a first type, e.g., an SI 2quater message, received from a base station. The mobile station then determines whether one or more RAT priority bits are present in the system information message, as shown at block 320. If not, additional ones of a plurality of available system information messages of the first type must be read before inter-RAT cell reselection may begin, as indicated at block 330. If the RAT priority bit(s) is present, however, the mobile station can selectively initiate inter-RAT cell reselection based on these one or more system information bits, as shown at block 340.

Figure 4:
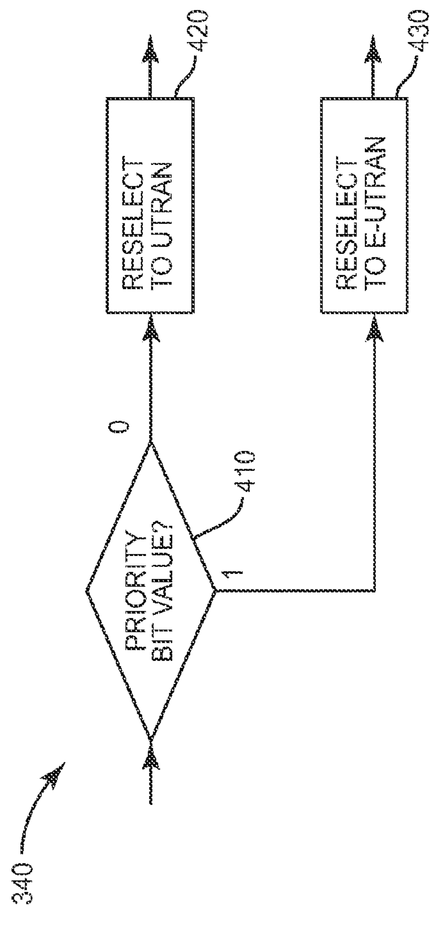
FIG. 4 is another process flow diagram illustrating additional details of some embodiments of the process of FIG. 3.

In some embodiments, the one or more bits comprise a single bit that, when present, indicates either that neighbor cells in a UTRAN network have the highest priority compared to all cells associated with other RATs described in system information messages of the first type or that neighbor cells in an E-UTRAN network have the highest priority compared to all cells associated with other RATs described in system information messages of the first type, wherein the absence of the single bit indicates that additional ones of a plurality of available system information messages of the first type must be read before inter-RAT cell reselection may begin. A process flow diagram illustrating one example of a selective reselection based on a single priority bit is provided in FIG. 4. First, as shown at block 410, the single priority bit is evaluated. If the priority bit has a value of 0, then the mobile station reselects to a UTRAN cell or frequency based on system information that describes the UTRAN cell or frequency, as shown at block 420. Likewise, if the priority bit has a value of 1, then the mobile station reselects to a E-UTRAN cell or frequency based on system information that describes the E-UTRAN cell or frequency, as shown at block 430. Of course, the opposite coding of the single priority bit could be used, in other embodiments.

Figure 5:
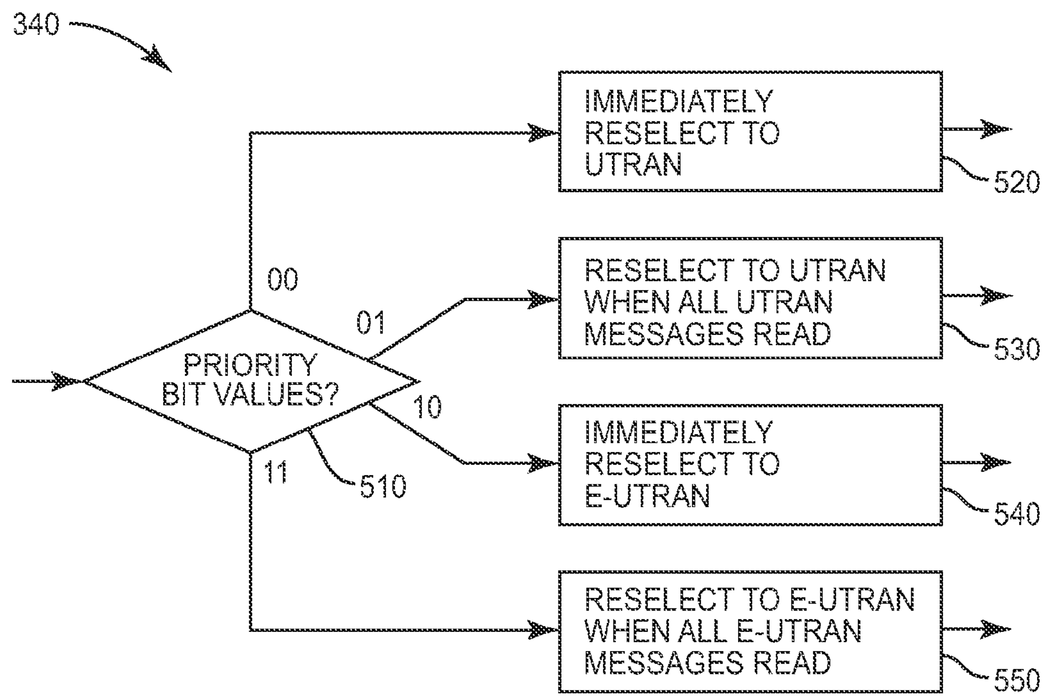
FIG. 5 is another process flow diagram illustrating additional details of some embodiments of the process of FIG. 3.

In other embodiments, the one or more priority bits comprise a pair of bits, the absence of which indicates that additional ones of a plurality of available system information messages of the first type must be read before inter-RAT cell reselection may begin. In some of these embodiments, the pair of bits, when present, indicate either: (i) that UTRAN neighbor cells have the highest priorities and that reselection to UTRAN may be initiated immediately upon reading the current instance of the system information message, (ii) that UTRAN neighbor cells have the highest priorities and that reselection to UTRAN may be initiated upon reading all instances of the system message that include UTRAN information; (iii) that E-UTRAN neighbor cells have the highest priorities and that reselection to E-UTRAN may be initiated immediately upon reading the current system information message, or (iv) that E-UTRAN neighbor cells have the highest priorities and that reselection to E-UTRAN may be initiated upon reading all instances of the system message that include E-UTRAN information. An example of this approach is shown in FIG. 5, where the evaluation of the priority bit is shown at block 510 and the options (i), (ii), (iii), and (iv) described above are shown at blocks 520, 530, 540, 550, respectively.

In still other embodiments, the one or more bits comprise a pair of bits associated with information for a given RAT, the absence of which bits indicates that additional ones of a plurality of available system information messages of the first type must be read before inter-RAT cell reselection may begin. It should be noted that in these embodiments the pair of bits may translate to four possible values, where none of these values indicates what the given RAT is. Accordingly, a receiving mobile terminal must determine what the given RAT is from other information, such as based on other information carried within the current system information message. The pair of bits indicate, when present, either: (i) that there are frequencies in RATs other than the given RAT (i.e. the RAT for which information is being extracted from the current instance of the system information message being read) that have higher priority, (ii) that there are no frequencies in RATs other than the given RAT having higher priority than the given RAT but that there are other frequencies within the given RAT, identified in other instances of the system information message, which have the same priority or higher priority than the given frequency (i.e. the frequency or frequencies associated with the given RAT), or (iii) indicating that unallowed cells are defined on this frequency in one or more additional instances of the system information message; or (iv) that the indicated frequency for the given RAT may be used for cell reselection without reading any further instances of the system information message.

Figure 6:
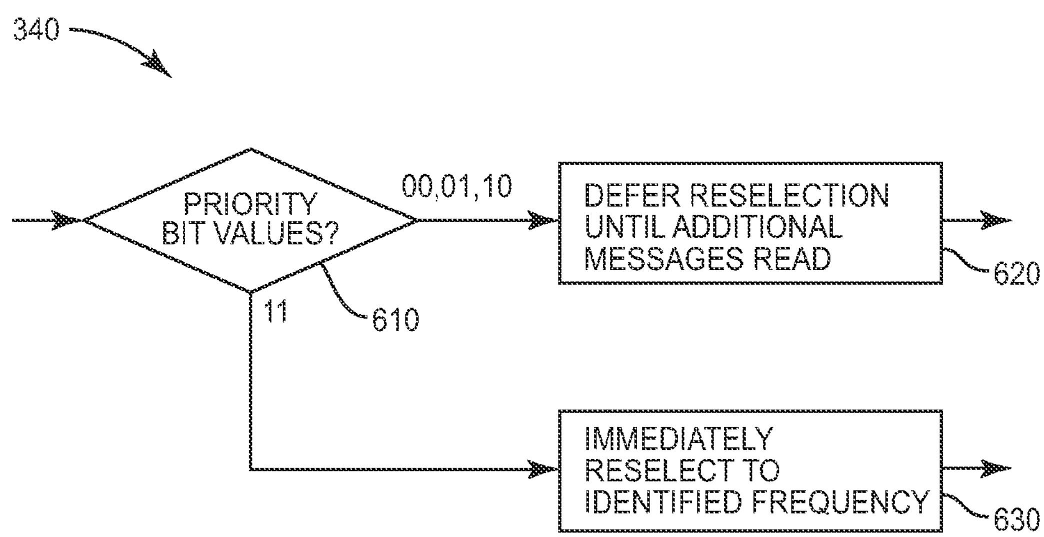
FIG. 6 is yet another process flow diagram illustrating additional details of some embodiments of the process of FIG. 3.

For the previous embodiment, it will be appreciated that outcomes (i), (ii), and (iii) will require that additional instances of the system information message be read before reselection, while outcome (iv) permits immediate reselection to the indicated frequency for the given RAT, where "immediate" is used herein to mean that reselection may be initiated without reading additional system information messages. This is illustrated in the process flow diagram of FIG. 6, where the two priority bits are evaluated, as shown at block 610. If the priority bits have the values 00, 01, or 10, then reselection is deferred until additional system information messages providing neighbor frequency information are read, as shown at block 620. If the priority bits have the values 11, reselection to the frequency indicated in the current system information message may begin immediately, as shown at block 630. Again, of course, alternative codings of the two priority bits may be used.

The techniques described above and illustrated in FIGS. 3 to 6 are implemented at a mobile station that receives the priority bits and performs reselection accordingly. Corresponding techniques for generating the priority bits, based on the relative priorities of neighboring RAT cells and/or frequencies can be performed in a fixed node of the wireless network, such as in a base station or in a radio network controller (RNC).

Figure 7:
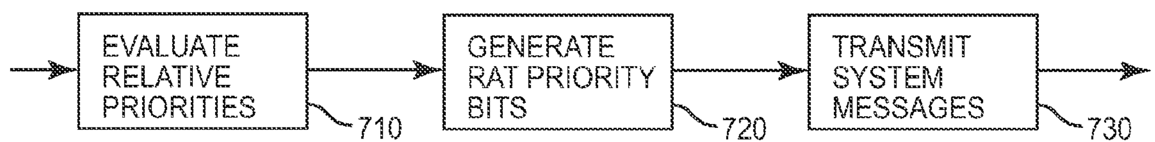
FIG. 7 is a process flow diagram illustrating an example technique for generating and transmitting system information messages in a network node.

A process flow diagram illustrating one example process for generating RAT priority bits is given in FIG. 7. As shown at block 7, the network node evaluates the relative priorities between the current RAT (e.g., GERAN) and neighboring cells and/or frequencies, one or more of which correspond to other RATs, such as UTRAN or E-UTRAN. The network node then generates one or more RAT priority bits, based on this evaluation, as shown at block 720. The meanings ascribed to the RAT priority may correspond to any of the codings described above in the mobile station context, or may have meanings that are variants of those specifically described above, provided only that there is a common understanding of the meaning between the network node and any receiving mobile stations. As shown at block 730, those RAT priority bits are then transmitted to one or more mobile stations as part of one or more system information messages, such as part of a series of SI 2quater messages in a GSM EDGE network.

Figure 8:
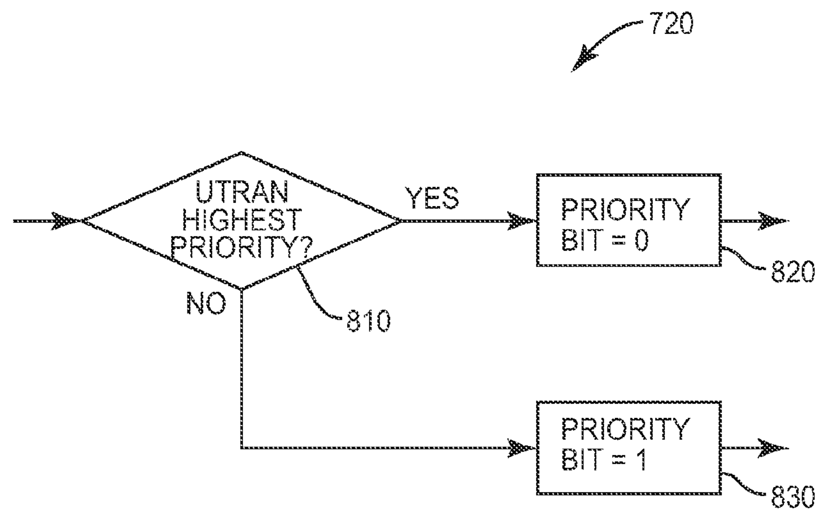
FIG. 8 is a process flow diagram illustrating details of one example technique for generating priority bits.

As discussed above in the mobile station context, only a single bit may be used in some embodiments. An example of this approach to generating the RAT priority bit is illustrated in FIG. 8. As shown at block 810, the network node evaluates whether a neighboring UTRAN or neighboring E-UTRAN cell or frequency has the highest priority. If a UTRAN cell has the highest priority, the priority bit is set to zero, as shown at block 820. If E-UTRAN has the highest priority, then the priority bit is set to one, as shown at block 830. In some embodiments, if neither UTRAN nor E-UTRAN has the highest priority, e.g., where a neighboring GERAN cell has higher priority, then no priority is generated at all, in which case the receiving mobile station knows to evaluate all of the system information messages describing neighboring cells or frequencies before making a reselection decision.

Figure 9:
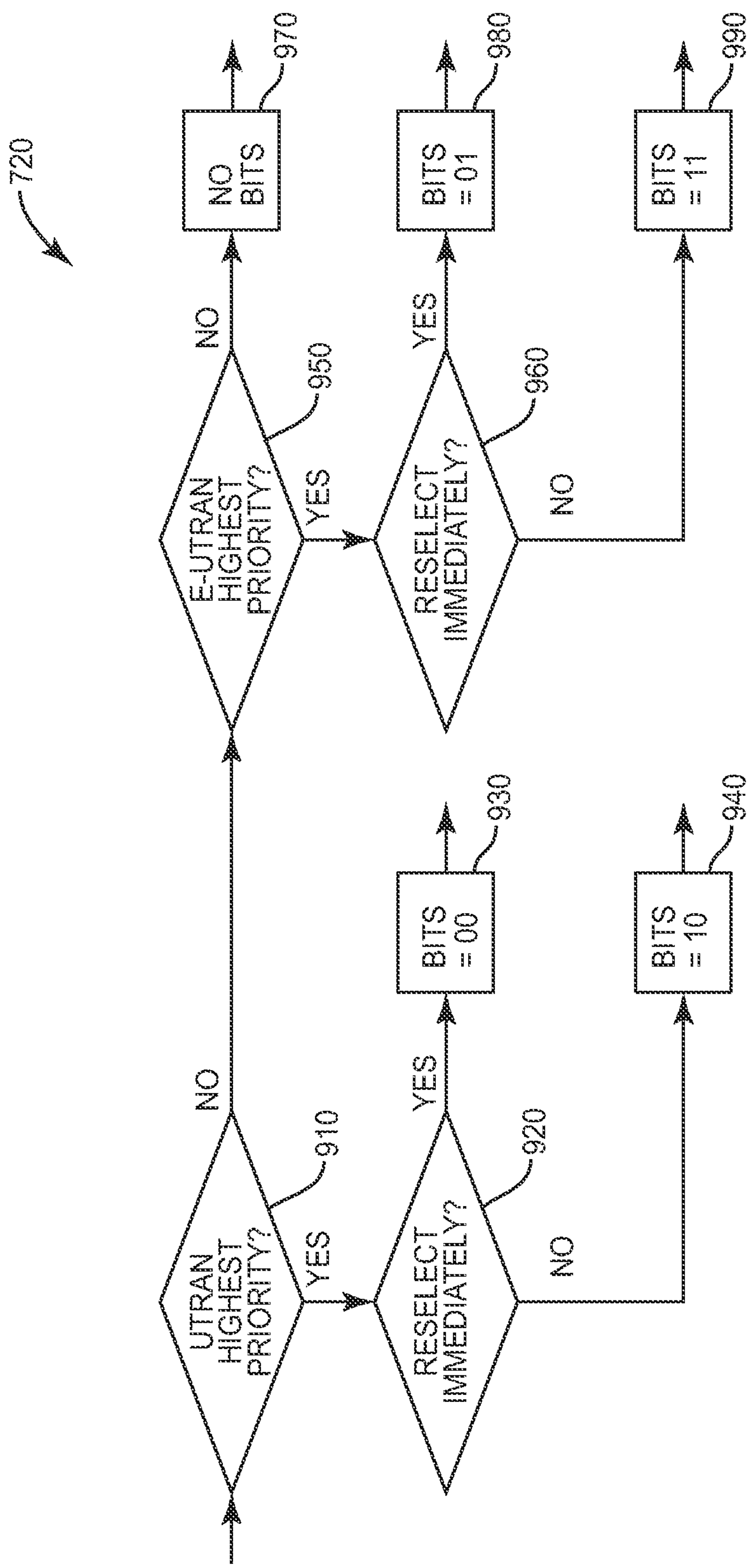
FIG. 9 is another process flow diagram illustrating details of an example technique for generating priority bits.

FIG. 9 illustrates an example approach to generating RAT priority bits where two bits are used. In this approach, if neither UTRAN nor E-UTRAN is the highest priority neighbor among all the cells belonging to other RATS and described in system information messages, as indicated by the "NO" branches from blocks 910 and 950, then no RAT priority bits are generated, as shown at block 970. If UTRAN or E-UTRAN is the highest priority neighbor, on the other hand, then the network node evaluates whether the mobile station should be permitted to reselect immediately upon reading the current system information message, i.e., the system information message that includes the RAT priority bits, or whether there is information that the mobile station needs that won't be available until subsequent system information messages are read. This evaluation is shown at block 920, for UTRAN, and block 960, for E-UTRAN, while the resulting bit settings are shown at blocks 930, 940, 980, and 990.

In another approach, the network node selectively sets the pair of bits to first values to indicate that there are higher priority frequencies in RATs other than a RAT associated with a current system information message, to second values to indicate that there are no higher priority frequencies in RATs other than the RAT associated with the current system information message but that there are frequencies, identified in other instances of the system information message, which are have the same priority or higher priority than a frequency associated with the current system information message or to indicate that unallowed cells are defined in another instance of the system information message for the frequency associated with the current system information message, or to third values to indicate that the frequency associated with the current system information message may be used for cell reselection without reading any further instances of the system information message.

Figure 10:
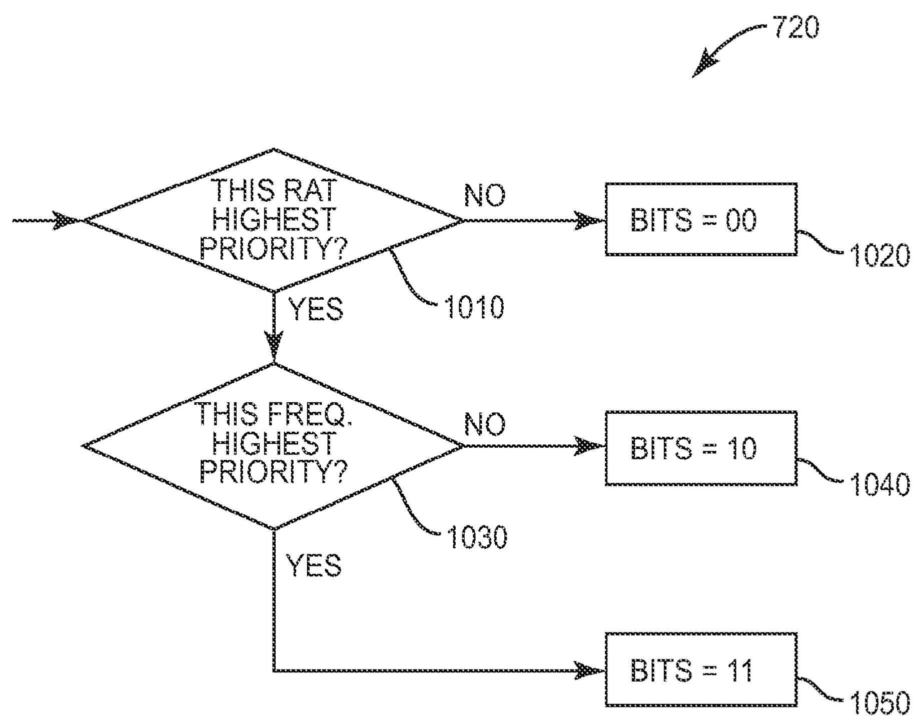
FIG. 10 is still another process flow diagram illustrating details of another example technique for generating priority bits.

FIG. 10 details one embodiment of processing logic for carrying out this approach. As shown at block 1010, the network node first determines whether a RAT associated with a current system information message (i.e., identified by or described in the system information message) is the highest priority. If no, then the pair of bits are set to "00", indicating that there are higher priority frequencies or cells in RATs other than the one described in the current message. If the RAT is associated with the current message is the highest priority RAT, or includes a frequency that is the highest priority of all neighbor cells or frequencies, then the network node determines whether the frequency associated with the current system information message is the highest priority among all the frequencies/cells described by a set of system information messages, as shown at block 1030. If not, the bits are set to "10", indicating that higher priority frequencies or frequencies having the same priority are described in other system information messages, as shown at block 1040. If yes, then the bits are instead set to "11", as shown at block 1050, indicating that the frequency associated with the current message is the highest priority frequency, and that reselection may thus be initiated immediately upon reading the current message.

Figure 11:
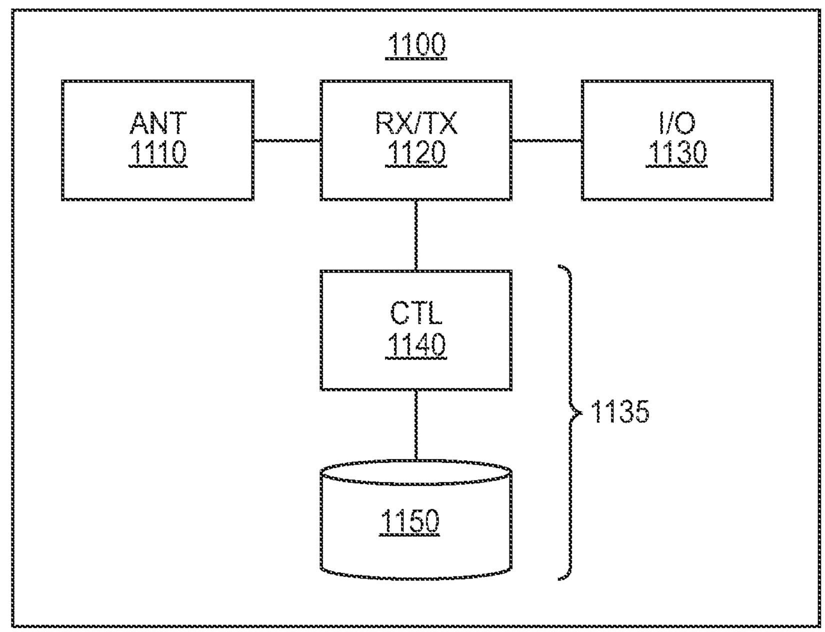
FIG. 11 is a block diagram illustrating components of a mobile station or base station according to some embodiments of the present invention.

FIG. 11 is a schematic diagram showing some components of a device, such as a mobile station, which is configured to carry out one or more of the techniques described above. The illustrated apparatus 1100 includes a controller 1140, which can comprise any suitable central processing unit (CPU), microcontroller, digital signal processor (DSP), application specific integrated circuit, etc., capable of executing software instructions stored in a memory 1150. Memory 1150 can be any combination of read and write memory (RAM) and read only memory (ROM). Memory 1150 may include persistent storage, which, for example, can be any single one or combination of magnetic memory, optical memory, solid state memory, such as fish memory, or even remotely mounted memory.

In addition to executable software instructions, memory 1150 stores program data, and user data received from the base station and to be transmitted to the base station, and also stores various parameters, pre-determined threshold values, and/or other program data for controlling the operation of the mobile station.

Together, the controller 1140 and memory 1150 form a processing circuit 1135 that is configured, via the storage suitable program instructions in memory 1150, to carry out any of the techniques described above, such as the described techniques for determining whether one or more RAT priority bits are present in a system information of a given type, such as a SI 2quater message, for determining, based on the presence or absence of the one or more RAT priority bits, whether all or several available system information messages of the given type must be read before inter-RAT cell reselection can take place, and for selectively initiating inter-RAT cell reselection based on the one or more RAT priority bits, when present.

Transceiver circuit 1120 includes a receiver circuit (RX) and transmitter circuit (TX), each of which includes various radio-frequency components (not shown). Transceiver 1120 processes radio signals received from and transmitted to one or more wireless base station. More particularly, transceiver circuit 1120 is configured for operation in more than one RAT, using known radio processing and signal processing components and techniques, typically according to one or more telecommunications standards.

Apparatus 1100 also comprises an input/output (I/O) interface circuit 1130, which may comprise user interface inputs and outputs, such as a keypad, display, touchscreen, and the like. Apparatus 1100 further comprises one or more transceivers 1120 as well as one or more antennas 1110 for radio communication with base stations, including GERAN base stations, UTRAN NodeB's, or E-UTRAN eNodeB's. Apparatus 1100 obviously includes various other feature that are not shown; these features, such as user interface circuitry, positioning circuits, and the like, are well known to those skilled in the art and their details are not important to an understanding of the present invention.

Other embodiments of the present invention may include one or more network nodes, such as a base station and/or a radio network controller, configured to transmit system information messages according to the techniques described herein, i.e., system information messages comprising one or more bits indicating whether additional instances of the SI 2quater messages need to be read before inter-RAT cell reselection can occur, or whether inter-RAT cell reselection may occur after reading of a single particular instance (i.e. the current instance) or a particular subset of instances containing system information for a particular RAT. In addition to appropriate communication interfaces for connecting the network nodes to other elements of the network, these network nodes may also comprise, like the apparatus 1100 in FIG. 11, a controller, which can comprise any suitable central processing unit (CPU), microcontroller, digital signal processor (DSP), application specific integrated circuit, etc., capable of executing software instructions stored in a computer program product, e.g., in the form of a memory. The software instructions stored in the memory include instructions for assembling and/or transmitting system information messages as described above, based on relatively priority information for each of several RATs and/or RAT frequencies.

Figure 12:
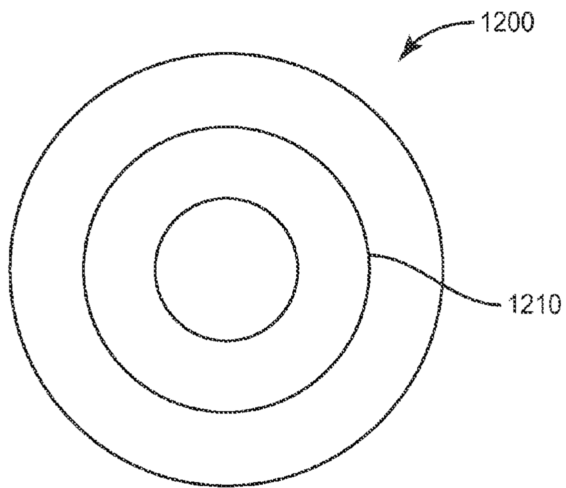
FIG. 12 shows one example of a computer program product comprising computer readable means according to some embodiments of the present invention.

FIG. 12 shows one example of a computer program product 1200 comprising computer readable means. On this computer readable means a computer program 1210 is stored, which computer program 1210 can cause a controller to execute a method according to any of the embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 1150 of a mobile station, or as the memory of a corresponding base station or RNC configured to carry out one or more of the techniques described above. While the computer program 1210 is here schematically shown as a track on the depicted optical disk, the computer program can be stored in any way which is suitable for the computer program product.

Figure 13:
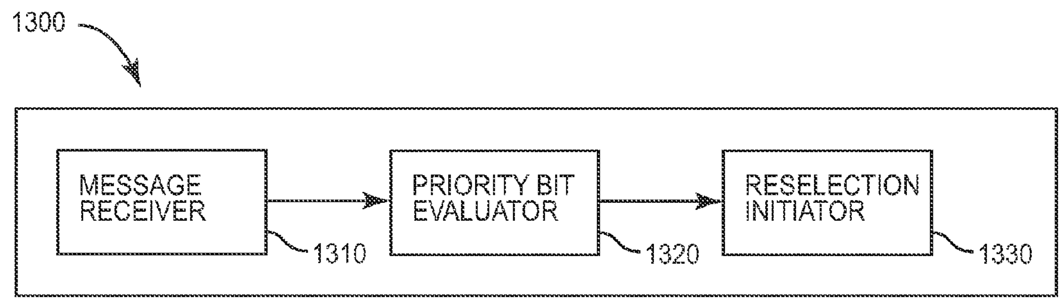
FIG. 13 illustrates functional units in an example mobile station apparatus.
Figure 14:
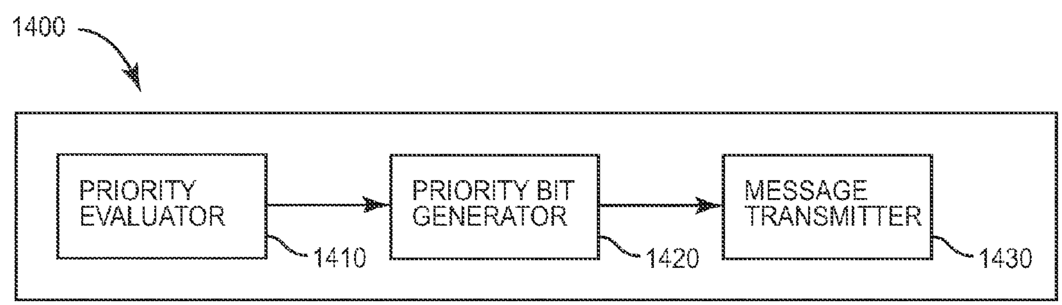
FIG. 14 illustrates functional units in an example network node apparatus.

As seen above, in various embodiments of the invention, processing circuits, using appropriate program code stored in memory, are configured to implement one or more of the techniques described herein. Of course, not all of the steps of these techniques are necessarily performed in a single microprocessor or even in a single module. Thus, FIG. 13 presents a more generalized view of a mobile station control circuit 1300 configured to carry out one or several of the techniques discussed herein. Likewise, FIG. 14 illustrates a corresponding control circuit 1400 in a network node, also configured to carry out one of the earlier described techniques. Either of these control circuits 1300 or 1400 may have a physical configuration that corresponds directly to processing circuits 1135, for example, or may be embodied in two or more modules or units. In any case, however, control circuit 1300 is configured to implement at least three functions. These functions are pictured in FIG. 13 as message receiver 1310, priority bit evaluator 1320, and reselection initiator 1330. Message receiver 1310 receives a system information message of a given type transmitted by a base station. Priority bit evaluator 1320 determines whether one or more RAT priority bits are present and, based on the presence or absence of RAT priority bits, determines whether additional ones of a plurality of available system information messages of the first type must be read before inter-RAT cell reselection may be initiated. Finally, reselection initiator 1330 selectively initiates inter-RAT cell reselection based on the one or more RAT priority bits, when present. Interpretation of the priority bits may be according to any of the coding schemes and approaches described earlier, or variants thereof.

Similarly, control circuit 1400 also has three functional components: a priority evaluator 1410, a priority bit generator 1420, and a message transmitter 1430. Priority evaluator 1410 evaluates relative priorities for two or more cells or two or more frequencies, corresponding to at least two RATs. Priority bit generator 1420 generates one or more RAT priority bits based on said evaluation, and message transmitter 1430 transmits a series of two or more system information messages includes the one or more RAT priority bits. Once again, the generation of the priority bits may be according to any of the coding schemes and approaches described earlier, or variants thereof.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive, and all modifications and variations that fall within the scope of the appended claims are intended to be embraced therein.

What is claimed is:

1. A method performed by a mobile station in a wireless network, the method comprising:

reading a first system information message of a first type received from a base station;

determining whether one or more Radio Access Technology (RAT) priority bits are present in the first system information message of the first type, said one or more RAT priority bits indicative of a priority of different RATs;

determining, based on the presence or absence of the one or more RAT priority bits, whether additional ones of a plurality of available system information messages of the first type must be read before inter-RAT cell reselection may begin; and selectively initiating inter-RAT cell reselection based on the one or more RAT priority bits, when present in the first system information message of the first type.

2. The method of claim 1, wherein the one or more bits, when present, comprise a single bit having either a first value indicating that neighbor cells in a UTRAN network have the highest priority compared to all cells belonging to other RATs described in system information messages of the first type or having a second value indicating that neighbor cells in an E-UTRAN network have the highest priority compared to all cells belonging to other RATs described in system information messages of the first type.

3. The method of claim 2, wherein selectively initiating inter-RAT cell reselection based on the one or more RAT priority bits comprises either initiating cell reselection to a neighbor cell in a UTRAN network upon determining that the single bit has the first value or initiating cell reselection to a neighbor cell in an E-UTRAN network upon determining that the single bit has the second value.

4. The method of claim 1, wherein the absence of the one or more bits in the first system information message indicates that additional ones of a plurality of available system information messages of the first type must be read before inter-RAT cell reselection may begin.

5. The method of claim 1, wherein the one or more bits comprise a pair of bits, the absence of which in the first system information message indicates that additional ones of a plurality of available system information messages of the first type must be read before inter-RAT cell reselection may begin, the pair of bits having, when present, either:

(i) first values indicating that UTRAN neighbor cells have the highest priorities and that reselection to UTRAN may be initiated immediately upon reading a current instance of the system information message of the first type; or (ii) second values indicating that UTRAN neighbor cells have the highest priorities and that reselection to UTRAN may be initiated upon reading all instances of the system information message of the first type that include UTRAN information;

(iii) third values indicating that E-UTRAN neighbor cells have the highest priorities and that reselection to E-UTRAN may be initiated immediately upon reading the current instance of the system information message of the first type; or (iv) fourth values indicating that E-UTRAN neighbor cells have the highest priorities and that reselection to E-UTRAN may be initiated upon reading all instances of the system information message of the first type that include E-UTRAN information.

6. The method of claim 5, wherein selectively initiating inter-RAT cell reselection based on the one or more RAT priority bits comprises either:

initiating cell reselection to a neighbor cell in a UTRAN network responsive to determining that the pair of bits have the first values; or initiating cell reselection to a neighbor cell in a UTRAN network upon determining that the pair of bits have the second values and upon determining that all instances of the system information message of the first type that include UTRAN information have been read; or initiating cell reselection to a neighbor cell in an E-UTRAN network responsive to determining that the pair of bits have the third values; or initiating cell reselection to a neighbor cell in an E-UTRAN network upon determining that the pair of bits have the fourth values and upon determining that all instances of the system information of the first type that include E-UTRAN information have been read.

7. The method of claim 1, wherein the one or more bits comprise a pair of bits associated with information for a given RAT, the pair of bits having, when present, either:

first values indicating that there are frequencies in RATs other than the given RAT that have higher priority; or second values indicating that there are no frequencies in RATs other than the given RAT having higher priority than the given RAT but that there are other frequencies associated with the given RAT, identified in other instances of the system information message of the first type, which have the same priority or higher priority than the frequency or frequencies associated with the given RAT; or third values indicating that unallowed cells are defined, in another instance of the system information message of the first type, on a frequency identified in the first system information message; or fourth values indicating that the frequency identified in the first system information message of the first type may be used for cell reselection without reading any further instances of the system information message of the first type.

8. The method of claim 7, wherein selectively initiating inter-RAT cell reselection based on the one or more RAT priority bits comprises either:

deferring cell reselection to a neighbor cell until additional system information messages of the first type have been read, upon determining that the pair of bits have the first values, the second values, or the third values; or initiating cell reselection to the frequency identified in the first system information message responsive to determining that the pair of bits have the fourth values.

9. A method performed by a network node in a wireless network, the method comprising:

evaluating relative priorities for two or more cells or for two or more frequencies, wherein the two or more cells or two or more frequencies correspond to at least two radio-access technologies (RATs);

generating one or more RAT priority bits based on said evaluation, said one or more RAT priority bits indicative of a priority of different RATs; and transmitting a series of two or more system information messages, wherein at least one of the two or more system information messages includes the one or more RAT priority bits, and wherein each of the two or more system information messages is transmitted at different times.

10. The method of claim 9, wherein the one or more bits comprise a single bit and wherein generating one or more RAT priority bits comprises either setting the single bit to a first value to indicate that neighbor cells in a UTRAN network have the highest priority compared to all cells belonging to other RATs described in system information messages of the first type or setting the single bit to a second value to indicate that neighbor cells in an E-UTRAN network have the highest priority compared to all cells belonging to other RATs described in system information messages of the first type.

11. The method of claim 9, wherein the one or more bits comprise a pair of bits, and wherein generating one or more RAT priority bits comprises either:

setting the pair of bits to first values to indicate that UTRAN neighbor cells have the highest priorities and that reselection to UTRAN may be initiated immediately upon reading a current instance of the system information message; or setting the pair of bits to second values to indicate that UTRAN neighbor cells have the highest priorities and that reselection to UTRAN may be initiated upon reading all instances of the system information message that include UTRAN information; or setting the pair of bits to third values to indicate that E-UTRAN neighbor cells have the highest priorities and that reselection to E-UTRAN may be initiated immediately upon reading a current instance of the system information message; or setting the pair of bits to fourth values to indicate that E-UTRAN neighbor cells have the highest priorities and that reselection to E-UTRAN may be initiated upon reading all instances of the system information message that include E-UTRAN information.

12. The method of claim 9, wherein the one or more bits comprise a pair of bits, and wherein generating one or more RAT priority bits comprises:

setting the pair of bits to first values to indicate that there are higher priority frequencies in RATs other than a RAT associated with a current system information message; or setting the pair of bits to second values to indicate that there are no higher priority frequencies in RATs other than the RAT associated with the current system information message but that there are frequencies, identified in other instances of the system information message, which have the same priority or higher priority than a frequency identified by the current system information message or to indicate that unallowed cells are defined in another instance of the system information message for a frequency identified by the current system information message; or setting the pair of bits to third values to indicate that a frequency identified by the current system information message and associated with the given RAT may be used for cell reselection without reading any further instances of the system information message.

13. A mobile station comprising:

a radio transceiver configured for operation according to multiple Radio Access Technologies, and configured to receive a first system information message of a first type from a base station; and a processing circuit configured to:

read the first system information message of the first type;

determine whether one or more Radio Access Technology (RAT) priority bits are present in the first system information message, said one or more RAT priority bits indicative of a priority of different RATs;

determine, based on the presence or absence of the one or more RAT priority bits, whether additional ones of a plurality of available system information messages of the first type must be read before inter-RAT cell reselection may begin; and selectively initiate inter-RAT cell reselection based on the one or more RAT priority bits, when present in the first system information message.

14. The mobile station of claim 13, wherein the one or more bits, when present, comprise a single bit having either a first value indicating that neighbor cells in a UTRAN network have the highest priority compared to all cells belonging to other RATs described in system information messages of the first type or having a second value indicating that neighbor cells in an E-UTRAN network have the highest priority compared to all cells belonging to other RATs described in system information messages of the first type.

15. The mobile station of claim 14, wherein the processing circuit is configured to initiate cell reselection to a neighbor cell in a UTRAN network upon determining that the single bit has the first value and that all instances of the system information message that include UTRAN information have been read or to initiate cell reselection to a neighbor cell in an E-UTRAN network upon determining that the single bit has the second value and that all instances of the system information message that include E-UTRAN information have been read.

16. The mobile station of claim 13, wherein the absence of the one or more bits in the first system information message indicates that additional ones of a plurality of available system information messages of the first type must be read before inter-RAT cell reselection may begin.

17. The mobile station of claim 13, wherein the one or more bits comprise a pair of bits, the absence of which in the first system information message indicates that additional ones of a plurality of available system information messages of the first type must be read before inter-RAT cell reselection may begin, the pair of bits having, when present, either:

first values indicating that UTRAN neighbor cells have the highest priorities and that reselection to UTRAN may be initiated immediately upon reading a current instance of the system information message of the first type; or second values indicating that UTRAN neighbor cells have the highest priorities and that reselection to UTRAN may be initiated upon reading all instances of the system information message of the first type that include UTRAN information;

third values indicating that E-UTRAN neighbor cells have the highest priorities and that reselection to E-UTRAN may be initiated immediately upon reading the current instance of the system information message of the first type; or fourth values indicating that E-UTRAN neighbor cells have the highest priorities and that reselection to E-UTRAN may be initiated upon reading all instances of the system information message of the first type that include E-UTRAN information.

18. The mobile station of claim 17, wherein the processing circuit is configured:

to initiate cell reselection to a neighbor cell in a UTRAN network responsive to determining that the pair of bits have the first values; and to initiate cell reselection to a neighbor cell in a UTRAN network upon determining that the pair of bits have the second values and upon determining that all instances of the system of the first type that include UTRAN information have been read; and to initiate cell reselection to a neighbor cell in an E-UTRAN network responsive to determining that the pair of bits have the third values; and to initiate cell reselection to a neighbor cell in an E-UTRAN network upon determining that the pair of bits have the fourth values and upon determining that all instances of the system of the first type that include E-UTRAN information have been read.

19. The mobile station of claim 13, wherein the one or more bits comprise a pair of bits associated with information for a given RAT, the absence of which pair of bits in the first system information message indicates that additional ones of a plurality of available system information messages of the first type must be read before inter-RAT cell reselection may begin, the pair of bits having, when present, either:

first values indicating that there are frequencies in RATs other than the given RAT that have higher priority; or second values indicating that there are no frequencies in RATs other than the given RAT having higher priority than the given RAT but that there are other frequencies associated with the given RAT, identified in other instances of the system information message of the first type, which have the same priority or higher priority than the frequency or frequencies identified by the first system information message and associated with the given RAT; or third values indicating that unallowed cells are defined, in another instance of the system information message, on a frequency identified in the first system information message and associated with the given RAT; or fourth values indicating that the frequency identified in the first system information message and associated with the given RAT may be used for cell reselection without reading any further instances of the system information message of the first type.

20. The mobile station of claim 19, wherein the processing circuit is configured to:

defer cell reselection to a neighbor cell until additional system information messages of the first type have been read, upon determining that the pair of bits have the first values, the second values, or the third values; and to immediately initiate cell reselection to the frequency identified in the first system information message upon determining that the pair of bits have the fourth values.

21. A network node for use in a wireless network, the network node comprising a processing circuit configured to:

evaluate relative priorities for two or more cells or two or more frequencies, wherein the two or more cells or two or more frequencies correspond to at least two radio-access technologies (RATs);

generate one or more RAT priority bits based on said evaluation, said one or more RAT priority bits indicative of a priority of different RATs; and transmit a series of two or more system information messages, wherein at least one of the two or more system information messages includes the one or more RAT priority bits, and wherein each of the two or more system information messages is transmitted at different times.

22. The network node of claim 21, wherein the one or more bits comprise a single bit and wherein the processing circuit is configured to selectively set the single bit to a first value to indicate that neighbor cells in a UTRAN network have the highest priority compared to all cells belonging to other RATs described in system information messages of the first type and to selectively set the single bit to a second value to indicate that neighbor cells in an E-UTRAN network have the highest priority compared to all cells belonging to other RATs described in system information messages of the first type.

23. The network node of claim 21, wherein the one or more bits comprise a pair of bits, and wherein the processing circuit is configured:

to selectively set the pair of bits to first values to indicate that UTRAN neighbor cells have the highest priorities and that reselection to UTRAN may be initiated immediately upon reading a current instance of the system information message; and to selectively set the pair of bits to second values to indicate that UTRAN neighbor cells have the highest priorities and that reselection to UTRAN may be initiated upon reading all instances of the system information message that include UTRAN information; and to selectively set the pair of bits to third values to indicate that E-UTRAN neighbor cells have the highest priorities and that reselection to E-UTRAN may be initiated immediately upon reading a current instance of the system information message; and to selectively set the pair of bits to fourth values to indicate that E-UTRAN neighbor cells have the highest priorities and that reselection to E-UTRAN may be initiated upon reading all instances of the system information message that include E-UTRAN information.

24. The network node of claim 21, wherein the one or more bits comprise a pair of bits, and wherein the processing circuit is configured:

to selectively set the pair of bits to first values to indicate that there are higher priority frequencies in RATs other than a RAT associated with a current system information message; and to selectively set the pair of bits to second values to indicate that there are no higher priority frequencies in RATs other than the RAT associated with the current system information message but that there are frequencies, identified in other instances of the system information message, which have the same priority or higher priority than a frequency identified by the current system information message or to indicate that unallowed cells are defined in another instance of the system information message for the frequency identified by the current system information message; or to selectively set the pair of bits to third values to indicate that a frequency identified by the current system information message and associated with the given RAT may be used for cell reselection without reading any further instances of the system information message.

* * * * *